Aug. 10, 1926.
E. F. GIANNATTASIO
1,595,717
TRANSMISSION APPARATUS
Filed Oct. 7, 1922      3 Sheets-Sheet 1
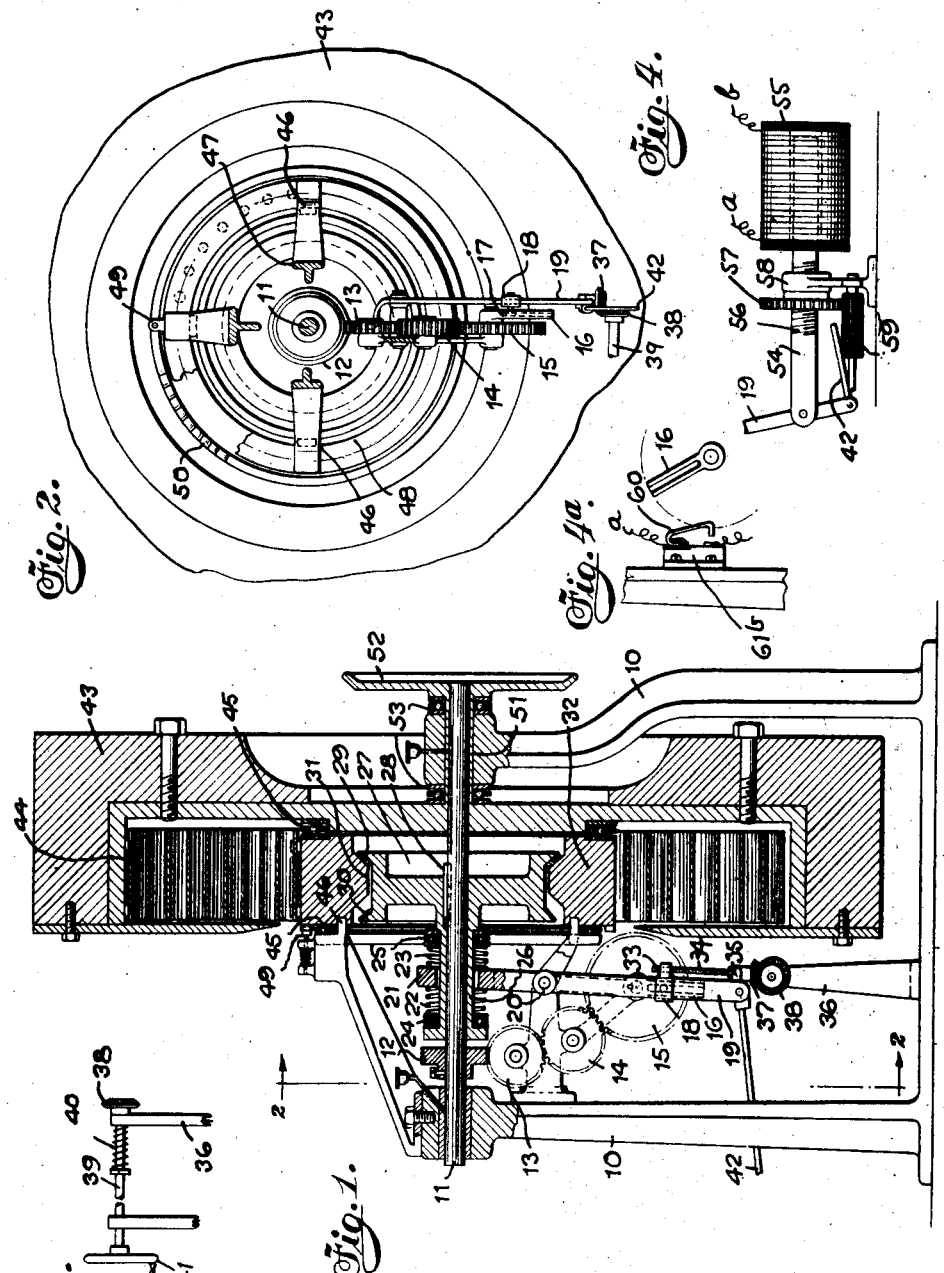
Inventor,
Ettore F. Giannattasio,
By his Attorney,
W. B. Hutchinson.

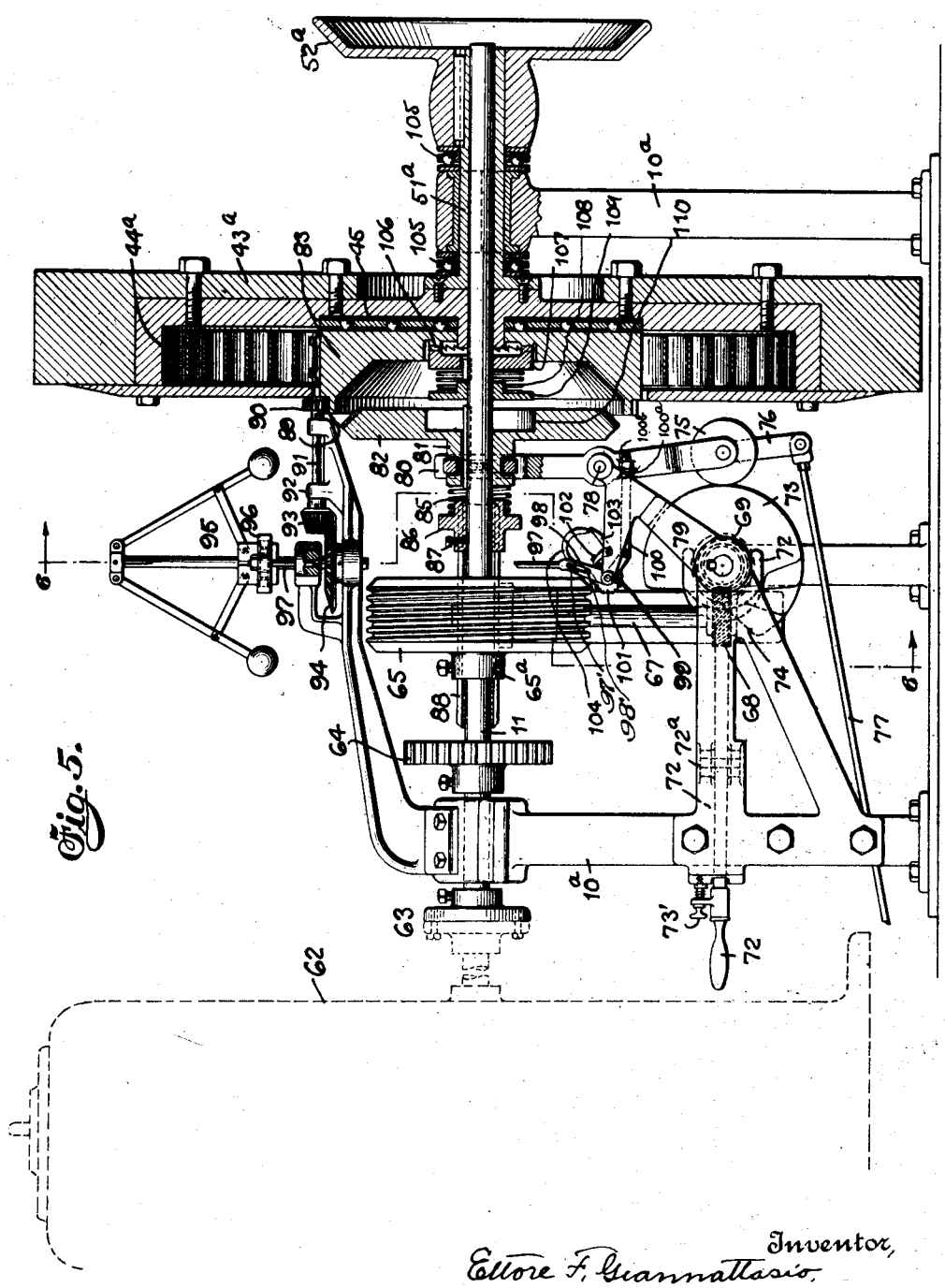

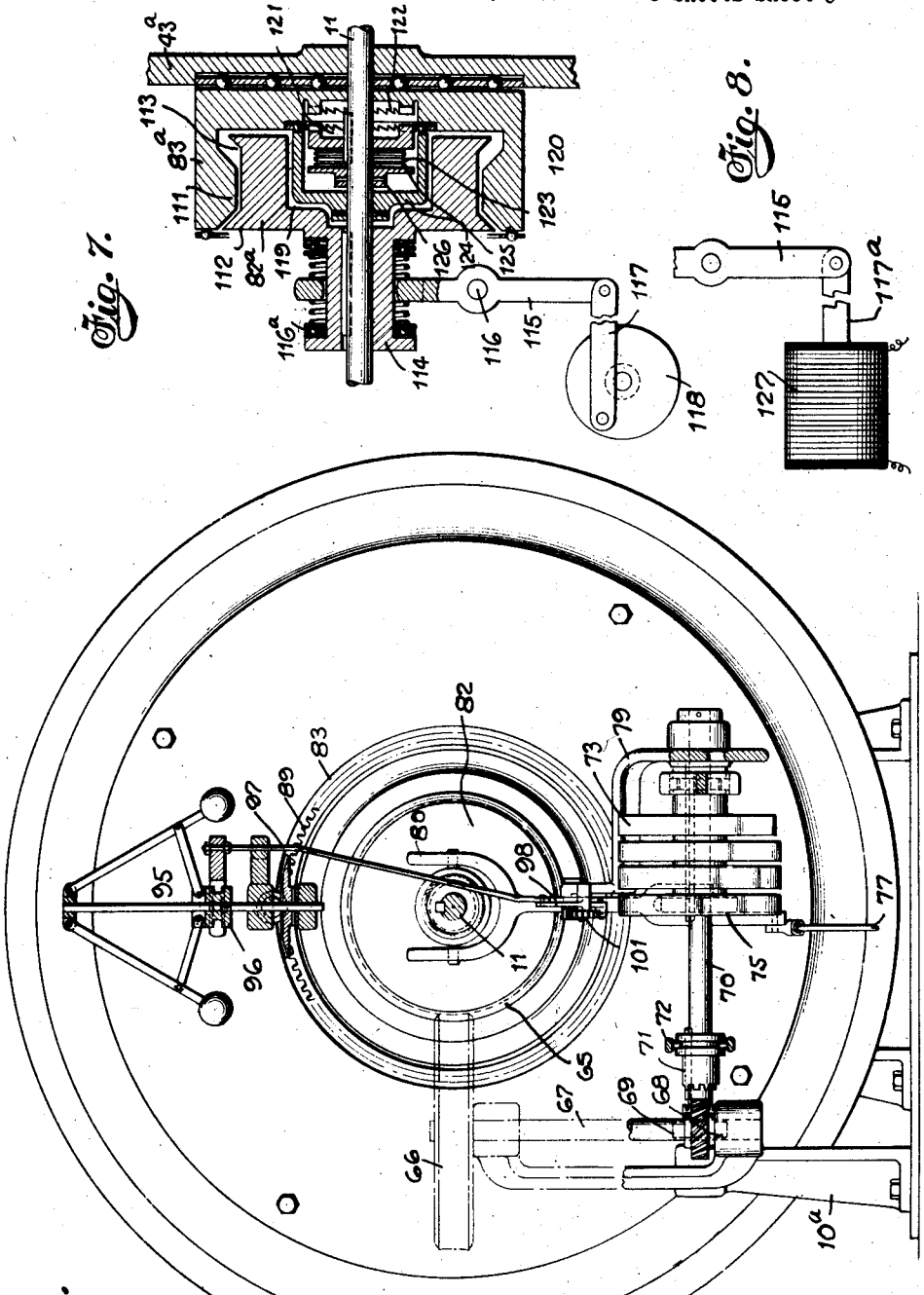

Patented Aug. 10, 1926.

1,595,717

UNITED STATES PATENT OFFICE.

ETTORE F. GIANNATTASIO, OF NEW YORK, N. Y.

TRANSMISSION APPARATUS.

Application filed October 7, 1922. Serial No. 592,947.

My invention relates to improvements in transmission apparatus such as are used for transmitting power from a main shaft or source to a shaft or machinery to be driven. The object of my invention is to produce an apparatus for the purpose which will transmit power with as little loss as possible, and which will operate at a comparatively constant speed. In carrying out my invention I use a driving shaft which can be coupled to the main shaft, motor, or other source of power, and on which is loosely mounted a fly-wheel having means for connecting with a machine or shaft to be driven. A clutch mechanism controls the connection between the fly-wheel and the driving shaft, so that at intervals the fly-wheel is thrown into and out of connection with the driving shaft, and when out of connection its own inertia will carry it forward until it is given a fresh impulse from the clutch mechanism. In one embodiment of the invention I use a spring motor connection between the fly-wheel and the clutch mechanism, which will serve to give additional impulse to the fly-wheel and the mechanism driven thereby, but the principle of the invention is the same whether or not the spring in the fly-wheel is used, and I also provide a governor controlling the speed and driven apparatus. Another important feature of my invention is to arrange some part of the shifting mechanism which puts the fly-wheel into and out of driving connection with its shaft, so that the source of power can be controlled whether it be steam, gas, electric, or other form of motor, that is to say, as the clutch is thrown into engagement so as to connect the fly-wheel with its driving shaft, the power can be turned on to a greater extent so as to give the necessary and immediate impulse to the fly-wheel; and as the clutch disengages, the power will be cut down or reduced, thus conserving energy and preventing the full power from being used when it is not necessary. The general object of the invention, however, is to produce a mechanism which as stated will drive constantly at a comparatively even speed and with little loss of power.

Reference is to be had to the accompanying drawings forming a part of this specification, in which similar reference characters indicate corresponding parts in all the views.

Figure 1 is a vertical longitudinal section of the apparatus embodying my invention.

Figure 2 is a broken cross section on the line 2—2 of Figure 1.

Figure 3 is a fragmentary detail showing means for regulating the throw of the clutch.

Figure 4 shows an electrical means of moving the clutch control lever.

Figure 4$^a$ is a detail showing one way of closing the circuit through the clutch control magnet.

Figure 5 is a longitudinal section of another form of the apparatus.

Figure 6 is a cross section on the line 6—6 of Figure 5.

Figure 7 shows in vertical section another modification of the double acting clutch, and Figure 8 shows an electrical means of operating the clutch lever as illustrated in Figure 7.

The drawings are by way of example merely, because it will appear from the description which follows that many of the details can be varied almost indefinitely without affecting the invention.

As shown in Figures 1 and 2 I employ a supporting frame 10 which may be of any approved design, and in which is rotatably supported a driving shaft 11 which at one end may be connected in any suitable way with a source of power, and on which is a fixed worm wheel 12 driving through a train of gears 13 and 14 a gear wheel 15. This gear wheel 15 carries a slotted arm 16 in which is held a roller 17 mounted on a sliding box or support 18 which moves on the clutch control lever 19. It can be seen that the roller 17 is thus mounted eccentrically with respect to gear wheel 15 and inasmuch as arm 16 rotates with gear wheel 15, the roller 17 will be carried around eccentrically with respect to the gear wheel 15. The box or member 18 can be moved longitudinally of the lever, and as the arm 16 has a crank action, it will be seen that the adjustment of the box and the roller 17 varies the operating length of the arm 16 and also varies the eccentricity of the roller 17, consequently varying the amount of throw given to the lever 19.

The lever 19 is pivoted on a suitable support as shown at 20, and one end is formed into a yoke 21 which moves between the steadying and shock absorbing springs 22 and 23, these being arranged on opposite sides of it between the ball bearings 24 and 25, and all being arranged upon the sleeve or hub 26 of the clutch pulley or member 27. The latter is keyed as shown at 28 to the shaft 11, so that it may slide thereon, but will turn therewith. The clutch pulley 27 has near opposite ends bearing surfaces 29 and 30 which are adapted to engage the corresponding surfaces of the cone 31 formed on the rotary rim or member 32. This drives a fly wheel and transmitting mechanism in the manner hereinafter described.

It will be seen that the driving surfaces 29 and 30 will alternately engage the sides of the cone 31, the clutch pulley 27 reciprocating to effect such engagement. As will be obvious, the reciprocation of pulley 27 is effected by means of clutch lever 19, and as before mentioned, the throw of lever 19 may be varied by adjustment of the box 18 and the roller 17. While the engagement of surfaces 29 and 30 with cone 31 is, of course, primarily dependent on shaft 11, it will be obvious that the intervals during which said surfaces engage the cone 31 is dependent upon the position of the box 18. This member 18 is adjusted in and out on the lever 19 in the following manner. On one side of the box or member 18 is a lug 33 which is screw threaded to engage a screw 34 which is mounted in a bearing 35 on the bracket 36, and the screw shaft 34 connects by bevel pinions 37 and 38 with a horizontal shaft 39, and this is normally pressed by the spring 40 so as to hold the pinions 37 and 38 out of mesh. The shaft 39 has a hand wheel 41 by which it can be operated. It will be seen that by pushing in on the shaft 39 against the tension of the spring 40, the pinions 37 and 38 will be forced into mesh, and then by turning the shaft the screw shaft 34 will actuate the box or member 18 and can be adjusted as desired.

At the outer end of the lever 19 is pivoted a rod 42 which if desired can be connected with mechanism not shown for the purpose of controlling the source of power, that is for operating a control if the source is electrical, or for throttling down the steam of a steam engine, or a fuel supply pipe of a gas engine.

It will be clearly understood that the rod 42 can be operatively connected with the source of power supply so as to accomplish the result desired, that is to say, I have shown means of connecting the clutch shifting mechanism so that as the clutch engages, the rod 42 will be actuated so as to increase the power supply, and as the clutch disengages, the rod will be actuated in the opposite direction so as to reduce the power supply, and thus no power will be wasted. It is not necessary to show the various devices for reducing the fuel supply to a gas engine, or throttling down a steam engine, or turning an arm of an electric control, or other form of power, and I have shown the rod as a convenient means of connection, but I wish it clearly understood that the connection might be with any moving part of the shifting or clutch mechanism so that the above result will be obtained. However in producing electric power, the electric current can also be automatically increased and decreased as the load which is operatively connected to the fly-wheel or spring motor is thrown in and cut out from the prime motor, and if desired, in employing electric motors as the main drive, the rod 42 can be dispensed with.

As shown in Figure 1 the connection between the clutch member 32 and the flywheel 43 is by means of a coil spring 44, one end of which is secured to the member 32 and the other to the fly wheel 43, thus forming a spring motor, and when the fly wheel is driven forward rapidly at the time of the closing of the clutch, it will tighten the spring 44, and during the interval that the clutch is shifting, the reaction of the spring 44 will tend to give the fly wheel 43 a greater impulse. The clutch member 32 is held between suitable thrust bearings 45, and it is guided on one end by lugs 46 which are fast on the arms 47 and enter an annular groove 48 in the member 32. A suitable pawl 49 on the machine frame engages a ratchet wheel 50 on the member 32, so as to prevent this from turning back in the wrong direction under the impulse of the spring 44.

The fly wheel 43 has an elongated hub forming the sleeve 51 which turns in suitable bearings and is rigidly connected to a driving cone 52 from which power may be taken to drive any desired mechanism, but of course other equivalent driving means might be substituted for the member 52. In order that there may be as little friction as possible, thrust bearings 53, which are preferably ball bearings, are arranged between the fly wheel 43, member 52, and the adjacent support.

It will be seen that as the shaft 11 revolves it will through the train of gearing and an arm 16, roller 17 and box 18 described oscillate the clutch control lever 19, which will act without shock and shift the clutch pulley 27 backward and forward on the shaft 11, so as to engage the opposite faces of the cone 31, and give a powerful impulse to the member 32, and through it to the spring 44 and fly wheel 43. This will tighten the spring 44, and as the member 32 cannot move backward because of the pawl 49, the reaction of the spring and the inertia of the fly wheel will carry the latter forward during the interval that the clutch member 27 is being shifted, and the power will be constantly taken from the member 52.

Obviously other means might be used for actuating the clutch lever 19, as for instance the electrical control shown in Figures 4 and 4ª. As here illustrated the armature shaft 54 of a solenoid magnet 55 is pivoted to the lever 19, and the shaft is screw threaded as shown at 56 so that the driving gear 57 can be adjusted thereon, this having a sliding connection with a long pinion 59 which can be suitably operated by means of any mechanical means, that is to say the operator can turn the pinion 59 so as to move the gear 57 in the desired direction, and this will have the effect of adjusting the member 54 backward or forward as desired, so as to enable it to impart the desired stroke to the lever 19. As before mentioned, the timing of the movement of lever 19 is dependent upon the position of box 18 and roller 17, with the lever 16, but it will be obvious that gear 59 may be rotated to adjust the position of gear 57 on core 54 thus regulating to a nicety the throw of lever 19 and consequently the engagement of the clutch element. In effect, the structure shown in Fig. 4 is a compensating or regulating means for the clutch elements. The rotating arm 16 or its equivalent can be made to strike a switch arm 60 of the switch 61ᵇ, closing the circuit through the wires a and b, and the magnet 55, and when this is closed it will pull on the armature 54 and actuate the lever 19.

In Figures 5 and 6 is shown another form of the apparatus, which is supported in a suitable frame 10ª and the driving shaft 11 as already described. This shaft is shown connected to a gasoline or other motor 62 by means of the coupling 63. I have also shown a gear 64 on the shaft to illustrate the fact that it may be geared to an electric motor or other source of driving power. In fact the means of driving the shaft is not important. The shaft carries a relatively large worm wheel 65 having a hub 65ª which is secured to the sleeve 88 hereinafter referred to, and the worm wheel connects by means of a worm gear 66 with a vertical shaft 67 which is suitably supported, and which connects by gears 68 and 69 with a shaft 70 which is at right angles to the shaft 11 (see Figure 6), the connection between the gear train and the shaft being by means of a clutch 71 which is operated by a clutch lever 72 to enable the shaft 70 to be thrown in and out of driving connection as desired. The shaft 72 is pivoted as shown at 72ª, and can be locked by a latch 73' (see Figure 5). This arrangement is not shown in detail as it is a common lever arrangement, and any other suitable lever can be substituted.

The shaft 70 carries a series of cams 73, any desired number being used, and these are cut away on one side as shown at 74, and they are all cut away in different segments so that each will have a different acting surface from any other. They severally engage frictionally a roller 75 which runs on a desired cam, and which is pivotally supported on a clutch lever 76 operating the main clutch as presently described, and having a connecting rod 77 at its lower end, which like the rod 42 already referred to, can be connected with means for controlling the fuel supply of a motor, or operating a control, or steam valve, or the like, these features forming no part of the present invention. The lever 76 is pivoted as shown at 78 on a bracket 79, and has its upper end formed into a yoke 80 which engages the hub 81 of the friction cone 82 which is keyed to the shaft 11 so as to slide thereon, and which is adapted to engage the cone surface of the corresponding cone pulley 83. To absorb shock, the hub 81 is backed by a spiral spring 85 which fits around the hub of a collar 86, this being adjustable on the shaft, and also secured to the sleeve 88 hereinbefore referred to. The position of the collar is fixed by a set screw 87 or the like.

The hollow cone pulley 83 has at one end a gear 89 which meshes with the pinion 90 on the shaft 91 (see Figure 5) this being suitably supported in a bracket 92, and having a bevel pinion 93 meshing with a pinion 94 of the governor 95. This governor is not referred to in detail because it is shown as the ordinary ball governor, and any suitable type of governor can be substituted. The governor has the customary sliding collar 96 which moves up and down according as the speed of the governor is increased or diminished, and according to the position of the balls, and the collar connects by a rod 97 with a bell crank 98 which is pivoted as shown at 99, the connection between the rod and bell crank being loose as shown in Figure 5, due to the fact that the lower end of rod 97 is provided with a pin 97' which works in a slot 98' in bell crank 98. The lower arm of the bell crank 98 connects by a link 100 with the lever 76. It will be seen, therefore, that when the roller 75 is riding on one of the cams 73 it will while on the high part of the cam move the lever so as to disengage the cone pulley 82 from the hollow cone pulley 83 as previously described, and when the low part of the cam is reached, the roller 75 will move into the said lower part, and the spring 85 already referred to will push the members 82 and 83 into engagement. It will be seen further, that the length of time that the members 82 and 83 are out of engagement will depend on the length of the high part of the cam 73. The cams can be adjusted on their shaft by any suitable means so as to bring any particular cam in connection with the roller 75, thus timing the movement of main clutch.

The shaft of the bell crank 98 is provided with a ratchet wheel 101 which is engaged by a pawl 102 having a tail 103 forming bell crank structure, and this is engaged by a finger 104 on the lower end of rod 97, so that in one position of the bell crank 98 the ratchet wheel is locked so as to hold the lever 76 and the link 100 together with the roller 75 in contact with a cam, but on the other movement of the bell crank 98 the tail piece 103 is struck and the pawl released.

The link 100 has a sliding connection with the lever 76, and is provided with a collar 100$^a$ (see Figure 5), which when the lever moves in one direction strikes the boss 100$^b$ and moves the lever 76 so as to hold the members 82 and 83 out of engagement.

Loosely mounted on the shaft 11 is a fly wheel 43$^a$, and this is preferably connected with the cone pulley member 83 by a spring 44$^a$ substantially as already described with reference to Figure 1. The fly wheel has an elongated hub or sleeve 51$^a$, keyed to the cone pulley 52$^a$ or other means of transmitting power from the shaft 11. The hub 51$^a$ is provided with suitable thrust bearings 105.

The cone pulley member 83 has at its hub ratchet teeth 106 which engage corresponding teeth on the member 107, which is keyed to the shaft 11, and this ratchet member is backed by a spring 108 fitting between the ratchet member and the collar 109 on the shaft 11. The cone pulley member 82 has a socket 110 to fit over the member 109, and when the member 82 is pushed in it pushes on the members 109 and 107 and locks the ratchets together, so that as the spring 44$^a$ is wound up it cannot by reason of the ratchet connection referred to unfold in the wrong direction but will add its tension to turn the shaft driving members 51$^a$ and 52$^a$ in the right direction. It will be obvious that when member 82 is released from 83, the fly wheel 43$^a$ will be rotated at a greater speed than the shaft 11 thus releasing the engagement of the ratchet teeth of member 107 from teeth 106.

In Figure 7 I have shown another slight modification of the structure, in which the member 83$^a$ has a double cone surface 111 engaged by corresponding parts 112 and 113 on the double cone pulley member 82$^a$. This has a hub 114 keyed to the shaft 11, and a shifting lever 115 which is pivoted at 116 and is centered between the springs 116$^a$, serves to push the member 82$^a$ backward and forward. The lever 115 corresponds to the levers 19 and 76, and can be operated by a link 117 connecting eccentrically with the pulley 118, which may be a gear, corresponding to gear 15 of Figure 1, or other suitable means may be provided for driving said pulley. By this arrangement the member 82$^a$ will be moved slowly backward and forward, first engaging one face 112 of the pulley 82$^a$, and next engaging the face 113, and during the interval that the friction pulley members are out of engagement, the shaft 11 will be carried forward by the inertia of the fly-wheel 43$^a$, supplemented by the spring motor connected therewith, not shown, the structure being similar to that disclosed in Figures 1 and 5.

Instead of working the lever by an eccentric rod, it can be pivoted to the armature 117$^a$ operated from the magnet 127 through which the circuit may be closed at pre-determined intervals, as already described.

The cone pulley member 83$^a$ has, at its hub, ratchet teeth 122 which engage corresponding teeth on a member 121 which latter is keyed to shaft 11, and this member 121 is backed by a spring 123 fitting between said member 121 and a collar 125 on shaft 11. The hub 114 is so formed as to contact with the hub of a cage 124, and force the same against the hub 126 of member 125 which latter, in turn, pushes the member 121 through the medium of spring 123 until the teeth of member 121 mesh with the teeth 122 in a manner similar to that heretofore described in connection with Figure 5, the operation of the device of Figure 7 being similar to the analogous parts shown in Figure 5.

From the foregoing description it will be seen that the structure which I have shown is of such a nature that it can be varied almost indefinitely, and the important feature is to have a driving shaft with a suitable fly-wheel thereon and having means for driving other units or transmitting power, and with intermittent connections between the shaft and the said fly-wheel, so that the inertia of the fly-wheel will carry forward its load steadily when the driving connection between the shaft and the fly-wheel is momentarily suspended. In one embodiment of the invention it will be noted I have a spring in connection with the fly-wheel, and the reaction of the spring serves to give additional impulse to the fly-wheel, but the principle is the same whether or not the spring is used. It is necessary, of course, to have the connection between the shaft and the fly-wheel timed so that it will be made before the fly-wheel perceptibly loses its speed. It will be seen that I can have either a single connection between the intermittent driving members between the shaft and the fly-wheel as in Figure 5, or a double connection as in Figures 1 and 7. I also prefer to use a governor to regulate the speed of the apparatus, and from the foregoing description it will be seen that the apparatus can be inserted as a connecting driving means between any suitable source of power, or a drive shaft thereof, and a shaft or machinery to be driven, and that the power will be transmitted at a substantially constant speed and without appreciable loss.

Broadly speaking my invention comprises a movable power transmitting member which is actuated alternately by impulses from a suitable motor and from its own inertia, and in means whereby the prime source of power is cut down when the power transmitting member moves under its own inertia, and is increased as the impulses are given to the said power transmitting member, to the end that the power may be generated, transmitted, and used with practically no waste. Specifically, and referring to Figure 1, with the roller 17 adjusted to the desired position in lever 16, upon rotation of shaft 11 the gear 15 will be rotated through the chain of gearing 12, 13 and 14. The clutch member 27 is keyed to the shaft 11 and will rotate therewith. Upon rotation of the shaft 11 the gear 15 will cause a rotation of the roller 17, throwing the lever 19 backwards and forwards, or more particularly reciprocating or oscillating the same in order to alternately engage the faces 29 and 30 of the clutch element 27 with the corresponding faces on member 32 thus winding the spring 44 secured to the fly wheel 43. Obviously, there will be certain periods when neither of the clutch faces 29 and 30 engage the corresponding clutch faces in member 32 and during these intervals the stored-up energy in the fly wheel will carry the fly wheel around, giving the same an additional impulse.

From the above it is believed that the invention is fully apparent to those skilled in the art but I desire it understood that the drawings are for illustrative purposes only and that various changes in the form and proportion of the device may be made within the scope of the appended claims without departing from the spirit of the invention.

I claim:—

1. A power transmitting apparatus comprising a driving shaft, a fly-wheel thereon having means for transmitting power, an intermittent driving connection between the shaft and the fly-wheel, and automatic means for regulating the said driving connection.

2. A power transmitting apparatus comprising a driving shaft, a fly-wheel loosely mounted thereon and having means for transmitting power, an intermittent driving connection between the shaft and the fly-wheel, and a spring forming a part of said driving connection.

3. A power transmitting apparatus comprising a driving shaft, a fly-wheel thereon having means for transmitting power, an intermittent driving connection between the driving shaft and the fly-wheel, and a spring motor forming a part of said driving connection and arranged so that its reaction shall give additional impulse to the fly-wheel.

4. A power transmitting apparatus comprising a driving shaft, a fly-wheel loosely mounted on the shaft and adapted to transmit power, an intermittent driving connection between the driving shaft and the fly-wheel, and a clutch forming a part of said intermittent driving connection.

5. A power transmitting apparatus comprising a driving shaft, a fly-wheel loosely mounted thereon and adapted to transmit power, a rotatable member connected with the fly-wheel, a second member sliding on but turning with the shaft and adapted to intermittently engage said rotatable member, and automatic means for sliding the said second member backward and forward on the shaft.

6. A power transmitting apparatus comprising a driving shaft, a fly wheel loosely mounted thereon, a cone pulley resiliently connected with said fly wheel, a second cone pulley slidable on said driving shaft and adapted during rotation to intermittently engage said first mentioned cone pulley, and automatic means for sliding said second cone pulley on said driving shaft during rotation whereby said second cone pulley intermittently engages said first named pulley to rotate the latter.

7. A power transmitting apparatus comprising a driving shaft, a fly wheel loosely mounted on the shaft and adapted to transmit power, a clutch mechanism controlling the connection between the fly-wheel and driving shaft, a lever for working the clutch mechanism, and a rod connected with the lever and adapted to connect with a system of power control.

8. A power transmitting apparatus comprising a driving shaft, a fly wheel loosely mounted thereon and adapted to transmit power, a clutch mechanism for connecting the driving shaft and the fly wheel, and a lever connected to the clutch mechanism for operating one of the members of the clutch mechanism, and means connected to said rod for periodically moving said rod to bring the several elements of the clutch mechanism into engagement.

9. A power transmitting mechanism comprising a driving shaft, a fly-wheel loosely mounted thereon and adapted to transmit power, an intermittently operating clutch mechanism forming the driving connection between the driving shaft and fly-wheel, automatic means for shifting the clutch mechanism, and means for regulating the clutch shifting mechanism.

10. A power transmitting apparatus comprising a driving shaft, a fly-wheel loosely mounted thereon and adapted to transmit power, a hollow cone pulley connected with the fly-wheel, a spring forming the connection between the hollow cone pulley and the fly-wheel, a detent for the hollow cone pulley, a second cone pulley sliding on the driving shaft and adapted to engage the hollow cone, and automatic mechanism for driving the cone members into and out of driving engagement.

11. A power transmitting apparatus comprising a driving shaft, a fly-wheel loosely mounted on the shaft and adapted to transmit power, an intermittent friction drive between the shaft and the fly wheel, and a governor for controlling the action of the said intermittent friction drive.

12. A power transmitting apparatus comprising a driving shaft, a fly-wheel loosely mounted on the shaft and adapted to transmit power, a friction pulley connection between the driving shaft and the fly-wheel, a rotatable wheel driven from the driving shaft, and a lever operatively connected with the friction pulley and with the aforesaid rotatable wheel.

13. An apparatus according to claim 12 characterized by the further fact that the connection between the rotatable wheel and the friction drive mechanism is adjustable, whereby the friction drive may be moved faster or slower as desired.

14. An apparatus for transmitting power comprising a driving shaft, a fly-wheel loosely mounted thereon and adapted to transmit power, an intermittent driving connection between the driving shaft and the fly-wheel, and a governor controlling said driving connection.

15. A power transmitting apparatus comprising a driving shaft, a fly-wheel loosely mounted on the shaft, means for making and breaking the driving connection between the shaft and the fly-wheel, and means for controlling the power supply from the movement of the aforesaid means for making and breaking the fly-wheel driving connection.

16. A power transmitting apparatus comprising a driving shaft, a fly-wheel loose on the shaft, intermittently acting means for making a driving connection between the shaft and the fly-wheel, and means for increasing the power supply as the fly-wheel is operatively connected with the shaft, and for reducing the power supply as the fly-wheel is disengaged from its driving connection with the drive shaft.

17. A power transmitting apparatus comprising a driving shaft, a fly-wheel mounted loosely thereon, a clutch mechanism for throwing the fly-wheel into and out of driving connection with its shaft, and means actuated by the movement of the clutch mechanism for controlling a source of power supply.

18. The combination with a motor and power transmitting means connected therewith, said power transmitting means having a constantly moving part from which power is taken, of means for intermittently breaking the connection between the motor and the part from which the power is taken, and automatic means for cutting down the power supply from the motor during the intervals when the motor and part from which power is taken are disconnected.

19. The combination with a motor, of a constantly rotatable member acting to transmit power, means for intermittently connecting said rotatable member with said motor, and automatic means for reducing the power supply during the interval that the rotatable member is disconnected from the motor.

20. In combination, a motor, a movable power transmitting member operated alternately by the motor and by its own inertia and automatic means for increasing and decreasing the power supply of the motor as the said power transmitting member is operated by the motor and by its own inertia.

21. In combination, a source of motive power, a power transmitting member adapted to be connected with and disconnected from said source of motive power, said member operating alternately by impulses from the source of motive power and by its own inertia as it is connected with or disconnected from said source of motive power respectively, and means for increasing and decreasing the power from said source of motive power when said member is connected with or disconnected from said source of motive power respectively, and means for controlling the impulses given to said power transmitting member.

ETTORE F. GIANNATTASIO.